US010942964B2

(12) United States Patent
Estok

(10) Patent No.: US 10,942,964 B2
(45) Date of Patent: Mar. 9, 2021

(54) APPARATUS AND METHOD OF EMBEDDING META-DATA IN A CAPTURED IMAGE

(71) Applicant: Hand Held Products, Inc., Fort Mill, SC (US)

(72) Inventor: Slavomir Estok, Eindhoven (NL)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/816,541

(22) Filed: Nov. 17, 2017

(65) Prior Publication Data

US 2018/0075033 A1 Mar. 15, 2018

Related U.S. Application Data

(63) Continuation of application No. 12/363,966, filed on Feb. 2, 2009, now abandoned.

(51) Int. Cl.
*G06F 16/50* (2019.01)
*G06F 16/48* (2019.01)
(Continued)

(52) U.S. Cl.
CPC ............. *G06F 16/48* (2019.01); *G06F 16/51* (2019.01); *G06F 16/58* (2019.01); *G06F 16/583* (2019.01);
(Continued)

(58) Field of Classification Search
None
See application file for complete search history.

(56) References Cited

U.S. PATENT DOCUMENTS 2,524,651 A 10/1950 Cooley
2,949,071 A 8/1960 Foures
(Continued)

FOREIGN PATENT DOCUMENTS

DE 10305384 8/2004
EP 1447770 8/2004
(Continued)

OTHER PUBLICATIONS

Advisory Action (PTOL-303) dated Feb. 3, 2015 for U.S. Appl. No. 12/363,966.
(Continued)

*Primary Examiner* — Jau Shya Meng
(74) *Attorney, Agent, or Firm* — Alston & Bird LLP

(57) ABSTRACT

Methods and apparatuses generate and render data embedded with associated meta-data in a human or machine recognizable format. The apparatus includes an obtaining device to acquire first data in a predetermined format and associated second data comprising information of the first data, and to output the first data and the associated second data; a processing device to receive the first data and the associated second data from the obtaining device, to process the first data and the associated second data to thereby generate meta-data based on the first data and/or the associated second data, to convert the meta-data into the predetermined format of the first data, and to embed the converted meta-data into the first data as a combined data in the predetermined format; and a rendering device to receive the combined data from the processing device, and to render the combined data in the human or machine recognizable format.

10 Claims, 6 Drawing Sheets

(51) Int. Cl.
  *G06F 16/51*     (2019.01)
  *G11B 27/30*     (2006.01)
  *G06F 16/58*     (2019.01)
  *G06F 16/583*    (2019.01)

(52) U.S. Cl.
  CPC ...... *G11B 27/3027* (2013.01); *G11B 27/3081* (2013.01)

(56) References Cited

U.S. PATENT DOCUMENTS

| | | |
|---|---|---|
| 3,561,432 A | 2/1971 | Yamaki et al. |
| 3,849,632 A | 11/1974 | Eckert, Jr. et al. |
| 3,969,612 A | 7/1976 | McJohnson |
| 4,042,823 A | 8/1977 | Decker et al. |
| 4,044,227 A | 8/1977 | Holm et al. |
| 4,078,864 A | 3/1978 | Howell |
| 4,139,822 A | 2/1979 | Urich et al. |
| 4,253,447 A | 3/1981 | Moore et al. |
| 4,271,344 A | 6/1981 | Horiuchi et al. |
| 4,298,312 A | 11/1981 | MacKenzie et al. |
| RE31,289 E | 6/1983 | Moore et al. |
| 4,557,598 A | 12/1985 | Ono et al. |
| 4,573,450 A | 3/1986 | Arakawa |
| 4,576,147 A | 3/1986 | Hashiguchi |
| 4,588,294 A | 5/1986 | Siegmund |
| 4,621,286 A | 11/1986 | Reitmeier et al. |
| 4,621,618 A | 11/1986 | Omagari |
| 4,651,201 A | 3/1987 | Schoolman |
| 4,656,508 A | 4/1987 | Yokota |
| 4,659,195 A | 4/1987 | D'Amelio et al. |
| 4,667,656 A | 5/1987 | Yabe |
| 4,680,457 A | 7/1987 | Robertson |
| 4,700,693 A | 10/1987 | Lia et al. |
| 4,727,859 A | 3/1988 | Lia |
| 4,733,937 A | 3/1988 | Lia et al. |
| 4,735,501 A | 4/1988 | Ginsburgh et al. |
| 4,787,369 A | 11/1988 | Allred, III et al. |
| 4,790,294 A | 12/1988 | Allred, III et al. |
| 4,794,912 A | 1/1989 | Lia |
| 4,796,607 A | 1/1989 | Allred, III et al. |
| 4,827,909 A | 5/1989 | Kato et al. |
| 4,862,253 A | 8/1989 | English et al. |
| 4,862,873 A | 9/1989 | Yajima et al. |
| 4,887,154 A | 12/1989 | Wawro et al. |
| 4,909,600 A | 3/1990 | Ciarlei et al. |
| 4,913,369 A | 4/1990 | Lia et al. |
| 4,926,257 A | 5/1990 | Miyazaki |
| 4,941,454 A | 7/1990 | Wood et al. |
| 4,941,456 A | 7/1990 | Wood et al. |
| 4,962,751 A | 10/1990 | Krauter |
| 4,979,498 A | 12/1990 | Oneda et al. |
| 4,980,763 A | 12/1990 | Lia |
| 4,989,581 A | 2/1991 | Tamburrino et al. |
| 4,998,182 A | 3/1991 | Krauter et al. |
| 5,010,876 A | 4/1991 | Henley et al. |
| 5,014,515 A | 5/1991 | Krauter |
| 5,014,600 A | 5/1991 | Krauter et al. |
| 5,018,436 A | 5/1991 | Evangelista et al. |
| 5,018,506 A | 5/1991 | Danna et al. |
| 5,019,121 A | 5/1991 | Krauter |
| 5,045,935 A | 9/1991 | Kikuchi |
| 5,047,848 A | 9/1991 | Krauter |
| 5,052,803 A | 10/1991 | Krauter |
| 5,053,956 A | 10/1991 | Donald et al. |
| 5,061,995 A | 10/1991 | Lia et al. |
| 5,066,122 A | 11/1991 | Krauter |
| 5,070,401 A | 12/1991 | Salvati et al. |
| 5,114,636 A | 5/1992 | Evangelista et al. |
| 5,140,319 A | 8/1992 | Riordan |
| 5,140,975 A | 8/1992 | Krauter |
| 5,148,403 A | 9/1992 | Gardner et al. |
| 5,191,879 A | 3/1993 | Krauter |
| 5,202,758 A | 4/1993 | Tamburrino |
| 5,203,319 A | 4/1993 | Danna et al. |
| 5,222,477 A | 6/1993 | Lia |
| 5,275,152 A | 1/1994 | Krauter et al. |
| 5,278,642 A | 1/1994 | Danna et al. |
| 5,314,070 A | 5/1994 | Ciarlei |
| 5,323,899 A | 6/1994 | Strom et al. |
| 5,335,662 A | 8/1994 | Kimura et al. |
| 5,347,989 A | 9/1994 | Monroe et al. |
| 5,356,339 A | 10/1994 | Bochot et al. |
| 5,365,331 A | 11/1994 | Tamburrino et al. |
| 5,373,317 A | 12/1994 | Salvati et al. |
| D358,417 S | 5/1995 | Medin et al. |
| 5,435,296 A | 7/1995 | Vivenzio et al. |
| 5,633,675 A | 5/1997 | Danna et al. |
| 5,663,552 A | 9/1997 | Komizo |
| 5,682,030 A | 10/1997 | Kubon |
| 5,699,262 A | 12/1997 | Lang et al. |
| 5,701,155 A | 12/1997 | Wood et al. |
| 5,734,418 A | 3/1998 | Danna |
| 5,751,341 A | 5/1998 | Chaleki et al. |
| 5,754,313 A | 5/1998 | Pelchy et al. |
| 5,770,841 A | 6/1998 | Moed et al. |
| 5,802,274 A | 9/1998 | Dorak et al. |
| 5,805,152 A | 9/1998 | Furusawa et al. |
| 5,857,963 A | 1/1999 | Pelchy et al. |
| 5,895,350 A | 4/1999 | Hori |
| 5,911,036 A | 6/1999 | Wright et al. |
| 5,918,211 A | 6/1999 | Sloane |
| 5,941,808 A | 8/1999 | Oder |
| 5,966,168 A | 10/1999 | Miyazaki |
| 5,989,185 A | 11/1999 | Miyazaki |
| 6,015,088 A | 1/2000 | Parker et al. |
| 6,066,090 A | 5/2000 | Yoon |
| 6,083,152 A | 7/2000 | Strong |
| 6,097,848 A | 8/2000 | Salvati |
| 6,106,457 A | 8/2000 | Perkins et al. |
| 6,133,908 A | 10/2000 | Scibora et al. |
| 6,139,490 A | 10/2000 | Breidenthal et al. |
| 6,141,042 A | 10/2000 | Martinelli et al. |
| 6,221,007 B1 | 4/2001 | Green |
| 6,285,916 B1 | 9/2001 | Kadaba et al. |
| 6,347,741 B1 | 2/2002 | Blanford et al. |
| 6,394,351 B1 | 5/2002 | Keys et al. |
| 6,432,046 B1 | 8/2002 | Yarush et al. |
| 6,468,201 B1 | 10/2002 | Burdick |
| 6,471,642 B1 | 10/2002 | Igarashi |
| 6,483,535 B1 | 11/2002 | Tamburrino et al. |
| 6,487,479 B1 | 11/2002 | Nelson |
| 6,494,739 B1 | 12/2002 | Vivenzio et al. |
| 6,512,919 B2 | 1/2003 | Ogasawara |
| 6,518,881 B2 | 2/2003 | Monroe |
| 6,538,732 B1 | 3/2003 | Drost et al. |
| D473,306 S | 4/2003 | Motoki et al. |
| 6,556,273 B1 | 4/2003 | Wheeler et al. |
| 6,590,470 B1 | 7/2003 | Burdick |
| 6,614,872 B2 | 9/2003 | Bueno et al. |
| 6,668,272 B1 | 12/2003 | Keller et al. |
| 6,697,794 B1 | 2/2004 | Milby |
| 6,697,805 B1 | 2/2004 | Choquier et al. |
| 6,695,211 B2 | 4/2004 | Keys et al. |
| 6,746,164 B1 | 6/2004 | Albright et al. |
| 6,758,403 B1 | 7/2004 | Keys et al. |
| 6,763,175 B1 | 7/2004 | Trottier et al. |
| 6,764,009 B2 | 7/2004 | Melick et al. |
| 6,772,098 B1 | 8/2004 | Stark et al. |
| 6,772,947 B2 | 8/2004 | Shaw |
| 6,775,602 B2 | 8/2004 | Gordon, Jr. et al. |
| 6,827,259 B2 | 12/2004 | Rathus et al. |
| 6,830,545 B2 | 12/2004 | Bendall |
| 6,834,807 B2 | 12/2004 | Ehrhart et al. |
| 6,851,610 B2 | 2/2005 | Knowles et al. |
| 6,892,947 B1 * | 5/2005 | Jam .......... G06K 1/12 235/462.01 |
| 6,908,034 B2 | 6/2005 | Alleshouse |
| 6,942,151 B2 | 9/2005 | Ehrhart |
| 6,950,829 B2 | 9/2005 | Schlabach et al. |
| 6,953,432 B2 | 10/2005 | Schiefer |
| 6,959,235 B1 | 10/2005 | Abdel-Malek et al. |
| 6,982,765 B2 | 1/2006 | Testin et al. |
| 7,068,309 B2 | 6/2006 | Toyama et al. |

(56) References Cited

U.S. PATENT DOCUMENTS

| | | | |
|---|---|---|---|
| 7,104,453 B1 | 9/2006 | Xiaoxun et al. | |
| 7,111,787 B2 | 9/2006 | Ehrhart | |
| 7,121,469 B2 | 10/2006 | Dorai et al. | |
| 7,126,630 B1 | 10/2006 | Lee et al. | |
| 7,134,993 B2 | 11/2006 | Lia et al. | |
| 7,150,399 B2 | 12/2006 | Barrus et al. | |
| 7,234,106 B2 | 6/2007 | Simske | |
| 7,236,596 B2 | 6/2007 | Prokoski | |
| 7,298,385 B2 | 11/2007 | Kazi et al. | |
| 7,321,673 B2 | 1/2008 | Watai et al. | |
| 7,328,847 B1 * | 2/2008 | Shen | G06K 7/14 235/462.01 |
| 7,346,221 B2 | 3/2008 | Chanas et al. | |
| 7,434,226 B2 | 10/2008 | Singh | |
| 7,508,419 B2 | 3/2009 | Toyama et al. | |
| 7,526,812 B2 | 4/2009 | DeYoung | |
| 7,543,748 B2 | 6/2009 | Kiliccote | |
| 7,571,857 B2 | 8/2009 | Payne et al. | |
| 7,571,859 B2 | 8/2009 | Knowles et al. | |
| 7,577,516 B2 | 8/2009 | Dobeck et al. | |
| 7,685,428 B2 | 3/2010 | Piersol | |
| 7,712,670 B2 | 5/2010 | Sauerwein et al. | |
| 7,734,093 B2 | 6/2010 | Wolff et al. | |
| 7,779,355 B1 | 8/2010 | Erol et al. | |
| 7,853,766 B2 | 12/2010 | Lindner et al. | |
| 7,865,957 B1 | 1/2011 | Gu et al. | |
| 7,970,738 B2 | 6/2011 | Wolff et al. | |
| 8,014,665 B2 | 9/2011 | Clifton et al. | |
| 8,043,156 B2 | 10/2011 | Ackley et al. | |
| 8,073,795 B2 | 12/2011 | Honisch | |
| 8,090,462 B2 | 1/2012 | Wininger et al. | |
| 8,270,303 B2 | 9/2012 | Sauerwein, Jr. et al. | |
| 8,791,795 B2 | 7/2014 | Wang | |
| 2001/0011233 A1 | 8/2001 | Narayanaswami | |
| 2001/0016825 A1 | 8/2001 | Pugliese et al. | |
| 2001/0032202 A1 | 10/2001 | Seese et al. | |
| 2002/0036565 A1 | 3/2002 | Monroe | |
| 2002/0039099 A1 | 4/2002 | Harper | |
| 2002/0065728 A1 | 5/2002 | Ogasawara | |
| 2002/0093633 A1 | 7/2002 | Milch | |
| 2002/0117548 A1 | 8/2002 | Keys et al. | |
| 2002/0128790 A1 | 9/2002 | Woodmansee | |
| 2002/0170970 A1 | 11/2002 | Ehrhart | |
| 2002/0171745 A1 | 11/2002 | Ehrhart | |
| 2002/0172498 A1 | 11/2002 | Esenyan et al. | |
| 2003/0004397 A1 | 1/2003 | Kameya et al. | |
| 2003/0009350 A1 | 1/2003 | Melick et al. | |
| 2003/0043040 A1 | 3/2003 | Zeps et al. | |
| 2003/0043041 A1 | 3/2003 | Zeps et al. | |
| 2003/0043042 A1 | 3/2003 | Moores et al. | |
| 2003/0046192 A1 | 3/2003 | Eguchi et al. | |
| 2003/0097042 A1 | 5/2003 | Eino | |
| 2003/0105565 A1 | 6/2003 | Loda et al. | |
| 2003/0128400 A1 | 7/2003 | Watai et al. | |
| 2003/0147549 A1 * | 8/2003 | Choi | G06T 1/0021 382/100 |
| 2003/0154133 A1 | 8/2003 | Furon et al. | |
| 2003/0160101 A1 | 8/2003 | Wiedenhoefer | |
| 2003/0171096 A1 | 9/2003 | Ilan et al. | |
| 2004/0015278 A1 | 1/2004 | Gordon et al. | |
| 2004/0064323 A1 | 4/2004 | Kemper et al. | |
| 2004/0096123 A1 | 5/2004 | Shih et al. | |
| 2004/0099731 A1 * | 5/2004 | Olenick | G07F 17/26 235/380 |
| 2004/0125077 A1 | 7/2004 | Ashton | |
| 2004/0126038 A1 | 7/2004 | Aublant et al. | |
| 2004/0155109 A1 | 8/2004 | Kenney et al. | |
| 2004/0155783 A1 | 8/2004 | Al-Sheikh | |
| 2004/0172327 A1 | 9/2004 | Falk | |
| 2004/0183900 A1 | 9/2004 | Karpen et al. | |
| 2004/0189631 A1 | 9/2004 | Kazi et al. | |
| 2004/0193016 A1 | 9/2004 | Root et al. | |
| 2004/0198631 A1 | 10/2004 | Hellberg | |
| 2004/0206820 A1 | 10/2004 | Melick et al. | |
| 2004/0215413 A1 | 10/2004 | Weldum et al. | |
| 2004/0223649 A1 | 11/2004 | Zacks et al. | |
| 2004/0225185 A1 | 11/2004 | Obata et al. | |
| 2004/0263661 A1 | 12/2004 | Okisu et al. | |
| 2005/0001909 A1 | 1/2005 | Okisu et al. | |
| 2005/0009564 A1 * | 1/2005 | Hayaashi | G06Q 20/12 455/558 |
| 2005/0015480 A1 | 1/2005 | Foran | |
| 2005/0027750 A1 | 2/2005 | Martin et al. | |
| 2005/0041097 A1 | 2/2005 | Bernstein et al. | |
| 2005/0050707 A1 | 3/2005 | Scott et al. | |
| 2005/0119786 A1 * | 6/2005 | Kadaba | B07C 3/00 700/224 |
| 2005/0128288 A1 | 6/2005 | Bernstein et al. | |
| 2005/0129108 A1 | 6/2005 | Bendall et al. | |
| 2005/0138382 A1 * | 6/2005 | Hougaard | G06Q 10/10 713/176 |
| 2005/0162643 A1 | 7/2005 | Karpen | |
| 2005/0171661 A1 | 8/2005 | Abdel-Malek et al. | |
| 2005/0187739 A1 | 8/2005 | Baust et al. | |
| 2005/0219263 A1 | 10/2005 | Thompson et al. | |
| 2005/0237557 A1 | 10/2005 | Ferlitsch | |
| 2005/0258246 A1 | 11/2005 | Wolff et al. | |
| 2005/0259289 A1 | 11/2005 | Ferlitsch et al. | |
| 2005/0281520 A1 | 12/2005 | Kehoskie et al. | |
| 2005/0286453 A1 | 12/2005 | Matsumoto | |
| 2005/0286463 A1 | 12/2005 | Matsumoto | |
| 2006/0006995 A1 | 1/2006 | Tabankin et al. | |
| 2006/0015919 A1 | 1/2006 | Karppinen et al. | |
| 2006/0026684 A1 | 2/2006 | Harvey et al. | |
| 2006/0031486 A1 | 2/2006 | Miner | |
| 2006/0043193 A1 | 3/2006 | Brock | |
| 2006/0050983 A1 | 3/2006 | Bendall et al. | |
| 2006/0053088 A1 | 3/2006 | Ali et al. | |
| 2006/0072903 A1 | 4/2006 | Weldum et al. | |
| 2006/0074769 A1 | 4/2006 | Looney et al. | |
| 2006/0094949 A1 | 5/2006 | Coonce et al. | |
| 2006/0095950 A1 | 5/2006 | Coonce et al. | |
| 2006/0120607 A1 | 6/2006 | Lev | |
| 2006/0124744 A1 | 6/2006 | Gormish et al. | |
| 2006/0173909 A1 | 8/2006 | Carlson et al. | |
| 2006/0185611 A1 | 8/2006 | Copeland et al. | |
| 2006/0187475 A1 * | 8/2006 | Fujioka | H04N 1/40012 358/1.9 |
| 2006/0196950 A1 | 9/2006 | Kiliccote | |
| 2006/0206245 A1 | 9/2006 | Camper et al. | |
| 2006/0212794 A1 | 9/2006 | Evans et al. | |
| 2006/0215023 A1 | 9/2006 | Coonce et al. | |
| 2006/0263789 A1 | 11/2006 | Kincaid | |
| 2006/0265590 A1 | 11/2006 | DeYoung et al. | |
| 2007/0033109 A1 | 2/2007 | Patten et al. | |
| 2007/0041622 A1 * | 2/2007 | Salva Calcagno | G06K 9/0008 382/124 |
| 2007/0047816 A1 | 3/2007 | Graham et al. | |
| 2007/0071290 A1 * | 3/2007 | Shah | G06K 9/00288 382/118 |
| 2007/0106536 A1 | 5/2007 | Moore | |
| 2007/0106754 A1 | 5/2007 | Moore | |
| 2007/0124278 A1 | 5/2007 | Lew, Jr. et al. | |
| 2007/0176000 A1 | 8/2007 | Cattrone et al. | |
| 2007/0177824 A1 | 8/2007 | Cattrone et al. | |
| 2007/0182829 A1 | 8/2007 | Zacks et al. | |
| 2007/0225931 A1 | 9/2007 | Morse et al. | |
| 2007/0226258 A1 | 9/2007 | Lambdin et al. | |
| 2007/0226321 A1 | 9/2007 | Bengtson | |
| 2007/0273774 A1 | 11/2007 | Holmes | |
| 2008/0027983 A1 | 1/2008 | Erol et al. | |
| 2008/0033983 A1 | 2/2008 | Ko | |
| 2008/0039206 A1 | 2/2008 | Ackley et al. | |
| 2008/0052205 A1 | 2/2008 | Dolley et al. | |
| 2008/0071143 A1 | 3/2008 | Gattani et al. | |
| 2008/0133295 A1 | 6/2008 | Cappel et al. | |
| 2008/0144116 A1 | 6/2008 | Pauly et al. | |
| 2008/0163364 A1 | 7/2008 | Ferlitsch | |
| 2008/0170775 A1 | 7/2008 | Pasupuleti et al. | |
| 2008/0183852 A1 | 7/2008 | Pramer et al. | |
| 2008/0247629 A1 | 10/2008 | Gilder et al. | |
| 2008/0272585 A1 | 11/2008 | Conard et al. | |
| 2008/0292300 A1 * | 11/2008 | van der Veen | G03B 17/24 396/311 |

(56) References Cited

U.S. PATENT DOCUMENTS

| | | |
|---|---|---|
| 2009/0161994 A1 | 6/2009 | Sauerwein et al. |
| 2009/0177495 A1* | 7/2009 | Abousy .............. G16H 50/20 705/3 |
| 2009/0218262 A1 | 9/2009 | Bowers et al. |
| 2009/0238626 A1 | 9/2009 | Ming et al. |
| 2009/0292930 A1 | 11/2009 | Marano et al. |
| 2010/0046842 A1 | 2/2010 | Conwell |
| 2010/0065636 A1 | 3/2010 | Byun et al. |
| 2010/0071003 A1 | 3/2010 | Bychkov et al. |
| 2010/0075292 A1 | 3/2010 | DeYoung et al. |
| 2010/0076976 A1 | 3/2010 | Sotirov et al. |
| 2010/0086192 A1 | 4/2010 | Grigsby et al. |
| 2010/0088123 A1 | 4/2010 | McCall et al. |
| 2010/0155479 A1 | 6/2010 | Ming |
| 2010/0157318 A1 | 6/2010 | Ming |
| 2010/0177212 A1 | 7/2010 | Holmes |
| 2010/0179857 A1 | 7/2010 | Kalaboukis et al. |
| 2010/0198876 A1 | 8/2010 | Estok |
| 2010/0217723 A1 | 8/2010 | Sauerwein, Jr. |
| 2010/0228387 A1 | 9/2010 | Bowers et al. |
| 2010/0314443 A1 | 12/2010 | Cudzilo |
| 2011/0058187 A1 | 3/2011 | Smith et al. |
| 2011/0066281 A1 | 3/2011 | Ksiazek |
| 2011/0079639 A1 | 4/2011 | Khan |
| 2011/0107370 A1 | 5/2011 | Cassanova et al. |
| 2011/0121066 A1 | 5/2011 | Tian et al. |
| 2011/0282733 A1 | 11/2011 | Gnanasambandam et al. |
| 2011/0282942 A1 | 11/2011 | Berger et al. |
| 2012/0076297 A1 | 3/2012 | Koziol et al. |
| 2013/0002890 A1 | 1/2013 | Sauerwein, Jr. et al. |

FOREIGN PATENT DOCUMENTS

| | | |
|---|---|---|
| WO | WO2005020577 A1 | 3/2005 |
| WO | WO20050124594 | 12/2005 |

OTHER PUBLICATIONS

Advisory Action (PTOL-303) dated Jan. 2, 2015 for U.S. Appl. No. 12/363,966.
Advisory Action (PTOL-303) dated Nov. 13, 2015 for U.S. Appl. No. 12/363,966.
Applicant Initiated Interview Summary (PTOL-413) dated May 23, 2016 for U.S. Appl. No. 12/363,966.
Final Rejection dated Mar. 14, 2016 for U.S. Appl. No. 12/363,966.
Final Rejection dated May 10, 2012 for U.S. Appl. No. 12/363,966.
Final Rejection dated Oct. 5, 2015 for U.S. Appl. No. 12/363,966.
Final Rejection dated Oct. 21, 2014 for U.S. Appl. No. 12/363,966.
Non-Final Rejection dated Apr. 9, 2015 for U.S. Appl. No. 12/363,966.
Non-Final Rejection dated Aug. 17, 2011 for U.S. Appl. No. 12/363,966.
Non-Final Rejection dated Jan. 10, 2014 for U.S. Appl. No. 12/363,966.

* cited by examiner

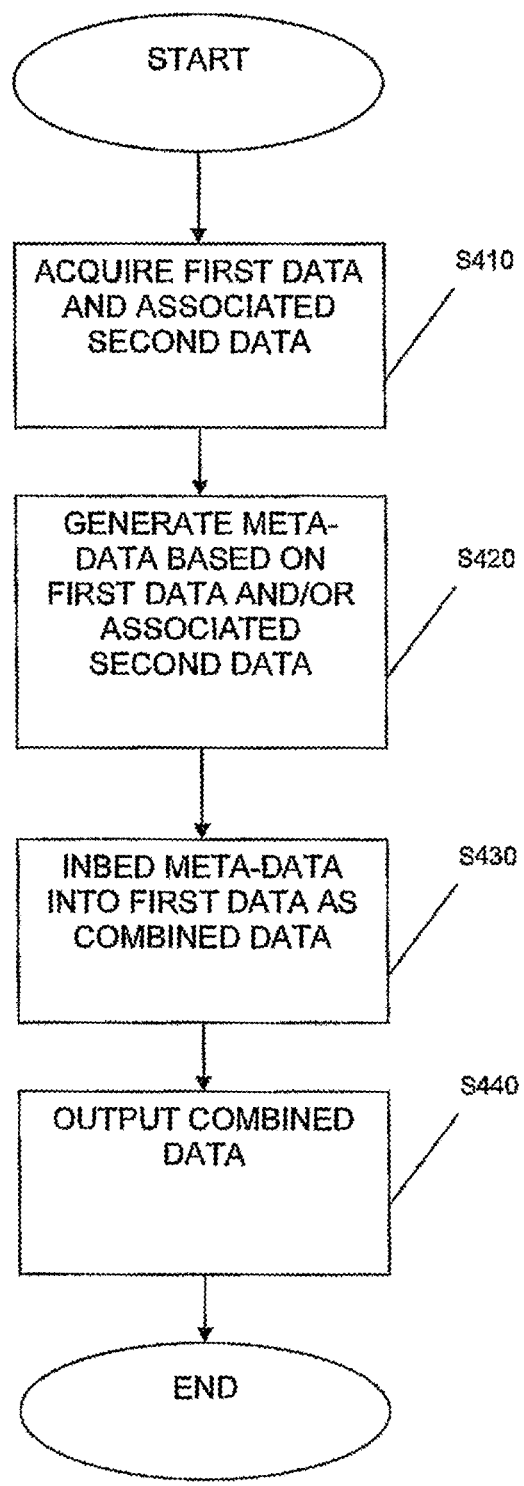

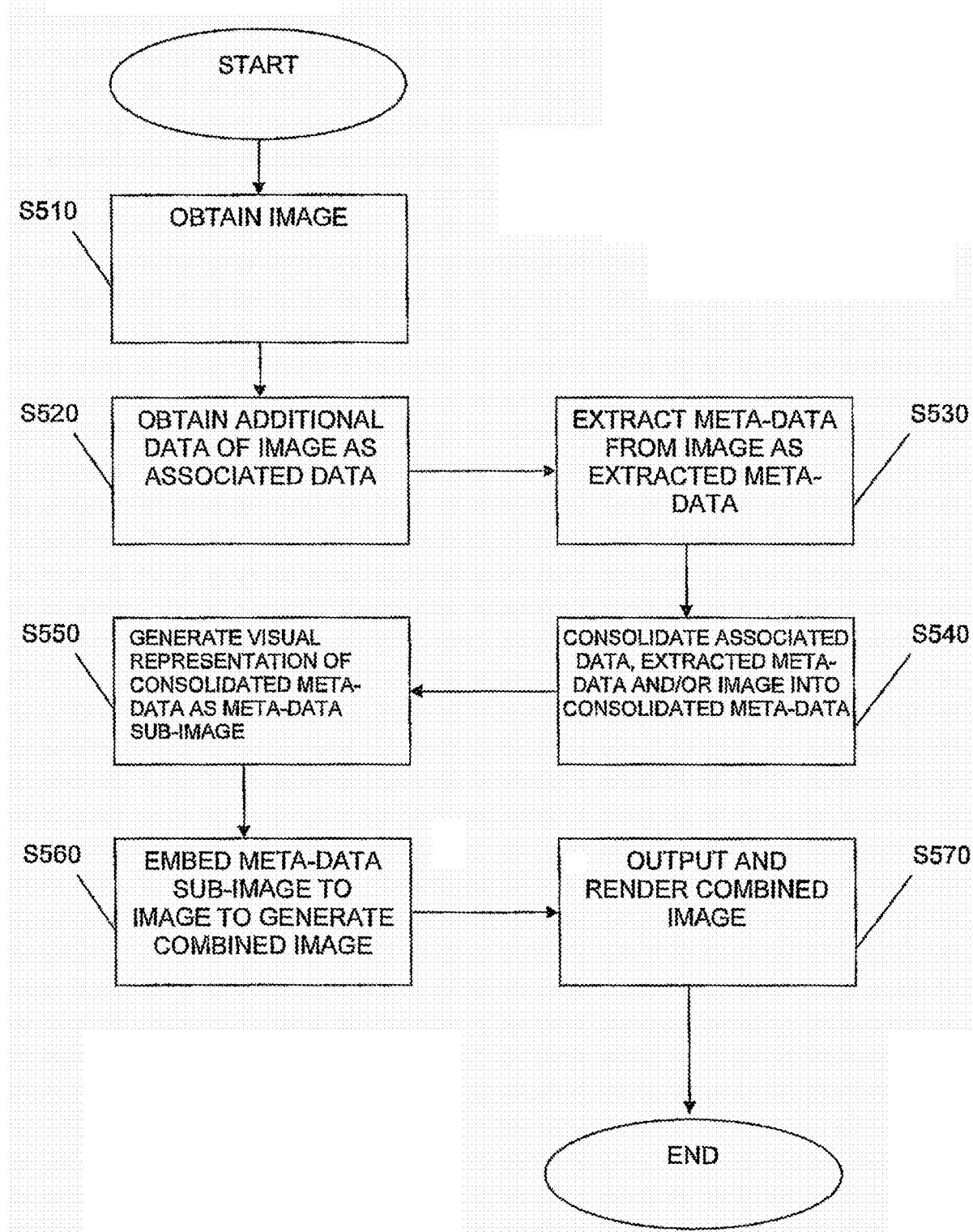

APPARATUS AND METHOD OF EMBEDDING META-DATA IN A CAPTURED IMAGE

CROSS-REFERENCE TO RELATED APPLICATIONS

The present application claims the benefit of U.S. patent application Ser. No. 12/363,966, filed on Feb. 2, 2009 and published as U.S. Pub. No. 2010/0198876 on Aug. 5, 2010. The foregoing patent application and patent publication are each hereby incorporated by reference their entirety.

BACKGROUND OF THE INVENTION

1. Field of the Invention

Aspects of the present invention relate to a method of embedding mete-data to an image, and an apparatus to embed the meta-data to the image. More specifically, aspects of the present invention relate to a method of embedding an associated mete-data of an image into the image, and an apparatus to embed the associated meta-data into the image so that the associated meta-data and the image may be visually perceived by a human user or programmatically perceived by a device, or both.

2. Description of the Related Art

Various devices and peripherals allow a user to capture an image of various locations or items in the form of image files (such as Joint Photographic Experts Group (JPEG)) or video (such as Moving Picture Experts Group (MPEG4)), or capture sounds in the form of audio files (such as MP3). The various devices and peripherals may further collect additional information for the captured image, video, or sounds contemporaneously. Examples of such additional information include time, geographical location, temperature, identification, and other properties of interest to the user.

SUMMARY OF THE INVENTION

To effectively use additional information that are collected with captured images, videos, or sounds, the additional information should be transformed into a usable format, and embedded into a file of the captured images, videos, or sounds in the usable format. Specifically, the embedded additional information is converted into meta-data having the same format as the captured images, videos, or sounds, and then embedded into the captured images, videos, or sounds. Once the additional information is transformed and imbedded, the imbedded additional information and the file may be rendered and perceived by a human user, a device, or both.

According to an aspect of the present invention, an apparatus to generate and render data embedded with associated meta-data in a human or machine recognizable format, includes an obtaining device to acquire first data in a predetermined format and associated second data comprising information of the first data, and to output the first data and the associated second data; a processing device to receive the first data and the associated second data from the obtaining device, to process the first data and the associated second data to thereby generate meta-data based on the first data and/or the associated second data, to convert the meta-data into the predetermined format of the first data, and to embed the converted meta-data into the first data as a combined data in the predetermined format; and a rendering device to receive the combined data from the processing device, and to render the combined data in the human or machine recognizable format.

According to an aspect of the present invention, an apparatus to generate and render an image embedded with associated meta-data, includes a data acquisition driver to acquire an image, and associated data comprising information of the image; a data processor to process the acquired image and the associated data from the data acquisition driver in order to generate meta-data based on the image, the associated data, or both, to convert the meta-data into a same format as that of the image, and to embed the converted meta-data into the image; and a rendering driver to receive the image embedded with the converted meta-data from the data processor, and to render the image with the embedded converted meta-data as an output image.

According to an aspect of the present invention, a method of generating and rendering data embedded with associated meta-data in a human or machine recognizable format, includes obtaining first data in a predetermined format, and second data that is associated with the first data; processing the obtained first data and the associated second data to generate meta-data based on the first data, and/or the associated second data, converting the meta-data into the predetermined format of the first data; embedding the converted meta-data into the first data to obtain a combined data; and rendering the combined data in the predetermined format of the first data, the predetermined format of the first data being the human or machine recognizable format.

According to an aspect of the present invention, a method of embedding meta-data in an image to be rendered together, includes obtaining the image; obtaining associated data contemporaneously with the image, the associate data being additional information of the image and includes a user input data, environmental data, and/or collected data that is associated with the image; extracting meta-data from the image that characterizes the image according to user selection as an extracted meta-data; generating a consolidated meta-data by consolidating the associated data and the extracted meta-data; generating a meta-data sub-image, which is a visual representation of the consolidated meta-data, by converting the consolidated meta-data Into the same format as the image; embedding the meta-data sub-image into the image to generate a combined image in the same format as the image; and visually rendering the combined image on a medium or a display device.

According to an aspect of the present invention, a visually rendered combined image formed a medium, the combined image comprising: a photographic image in a predetermined format; and an embedded meta-data sub-mage that is positioned in a predetermined position of the photographic image, the embedded meta-data sub-image being an image representation of information of the photographic image, and being in the same predetermined format as the photographic image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates a method of embedding meta-data to an obtained data according to an aspect of the present invention;

FIG. 5 illustrates a method of embedding meta-data in an image according to an aspect of the present invention.

DETAILED DESCRIPTION OF THE EMBODIMENTS

Figure 1:
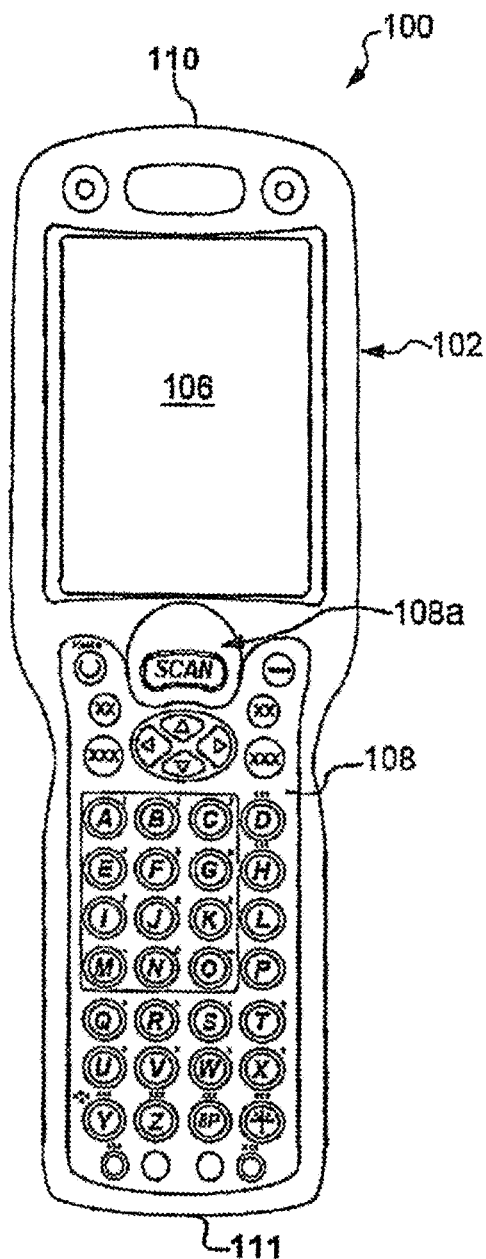
FIG. 1 illustrates an input device to obtain an image and associated information according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

A method is herein conceived to be a sequence of steps or actions leading to a desired result and may be implemented as software. While it may be convenient to discuss such software as if embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may be described in aspects of the present invention, there is no intention to limit the scope of the claims.

With respect to the software described herein, those of ordinary skill in the art will recognize that there exist a variety of platforms and languages for creating software for performing the methods outlined herein. Aspects of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a microprocessor, but may be executed using other circuits. For example, the methods could be implemented on a digital signal processor, a FPGA, or with HDL (Hardware Design Language) in an ASIC.

FIG. 1 illustrates an input device to obtain an image and associated information according to an aspect of the present invention. As shown in FIG. 1, illustrated is a type of data collection device referred to as a portable data terminal (PDT) as an example of the input device. A PDT generally integrates a mobile computer, one or more data transport paths and one or more data collection subsystems. The mobile computer portion is generally similar to a typical touch screen consumer oriented portable computing devices (e.g. "Pocket PCs" or "PDAs"), such as those available from PALM®, HEWLETT PACKARD®, and DELL®. The data transport paths include wired and wireless paths, such as 802.11, IrDA, BLUETOOTH, RS-232, USB, CDMA, GSM (incl. GRPS), and so forth. The data collection subsystem generally comprises a device that captures data from an external source, for example, touches, keystrokes, RFID signals, images, and bar codes. The PDT is distinguished from typical consumer oriented portable computing devices through the use of "industrial" components integrated into a housing that provide increased durability, ergonomics, and environmental independence over the typical consumer oriented devices. Additionally, the PDT tends to provide improved battery life by utilizing superior batteries and power management systems. Referring back to FIG. 1, the PDT 100 utilizes an elongated body 102 supporting a variety of components, including: a battery (not illustrated); a touch screen 106 (generally comprising an LCD screen under a touch sensitive panel); a keypad 108 (including a scan button 108a); a scan engine (not illustrated); and a data/charging port (also not illustrated). The scan engine may comprise, for example, one or more of an image engine, a laser engine, or an RFID engine. The scan engine is generally located near a top end 110 of the PDT 100 and is used to scan markings such as product codes. The data/charging port typically comprises a proprietary mechanical interface with one set of pins or pads for transmitting and receiving data (typically via a serial interface standard such as USB or RS-232) and a second set of pins or pads for receiving power for operating the system and/or charging the battery. The data charging port is generally located near a bottom end 111 of the PDT 100.

In use, the user presses the scan key 108a to initiate data capture via the scan engine. The captured data is analyzed, e.g. decoded to identify the information represented, stored and, displayed on the touch screen 106. Additional processing of the data may take place on the PDT 100 and/or an external data processing resource to which the data is transmitted.

In other aspects of the present invention, the scan key 108a or another key may be used to initiate image capture via the image engine for further processing. In such a case, the image engine may be used to obtain an image of a subject, such as merchandise. Additionally, the PDT 100 may have a microphone to capture sounds, sensors to measure temperature or other environmental information, a GPS system to obtain position information of a location, a wireless connection to connect to a network or the internet, for example.

Figure 2:
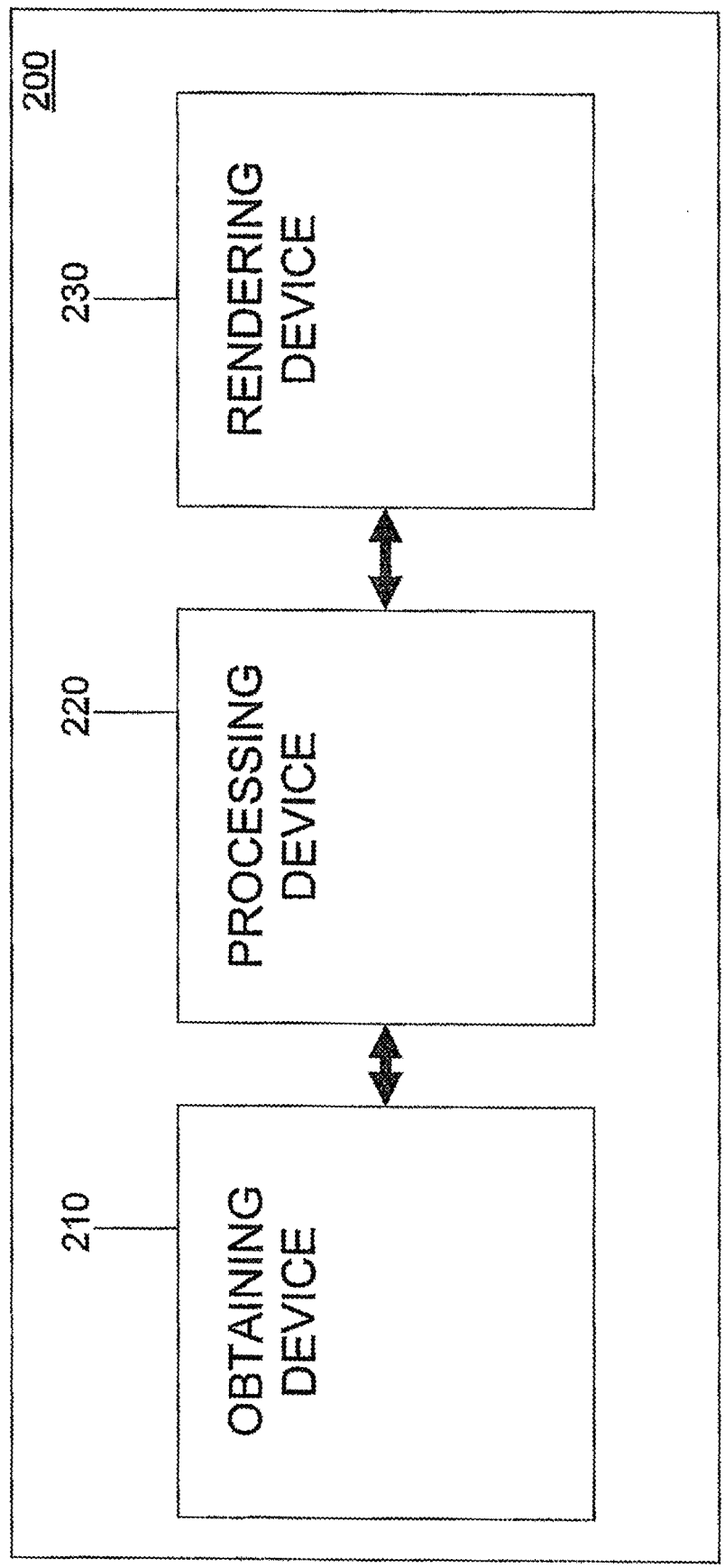
FIG. 2 illustrates a schematic of an apparatus 200 to embed meta-data to an obtained data according to an aspect of the present invention.

FIG. 2 illustrates a schematic of an apparatus to embed meta-data to an obtained data according to an aspect of the present invention. As shown in FIG. 2, the apparatus 200 includes an obtaining device 210, a processing device 220, and a rendering device 230.

Specifically, the obtaining device 210 acquires, or receives input of first data, and second data that is associated or corresponds to the first data, and outputs the first data and the associated second data to the processing device 220. In turn, the processing device 220 processes the acquired or received first data and the associated second data, generates meta-data based on the first data, the associated second data, or both, converts the meta-data into a format of the first data (referred to as a sub meta-data) or another format (referred to as a block meta-data), and either embeds the meta-data into the first data as a combined data or provides the block meta-data for later rendering as a standalone meta-data.

The processing device 220 then provides the combined data and the block meta-data to the rendering device 230 for rendering. The rendering device 230 receives the combined data and/or the block meta-data from the processing device 220, and outputs the combined data in a predetermined format, and/or renders the block meta-data as standalone meta-data in the same or different format as the predetermined format in aspects of the present invention, the first and second data may be an image, video, audio, sound, text, music, or in other human user or device perceivable formats.

Figure 3:
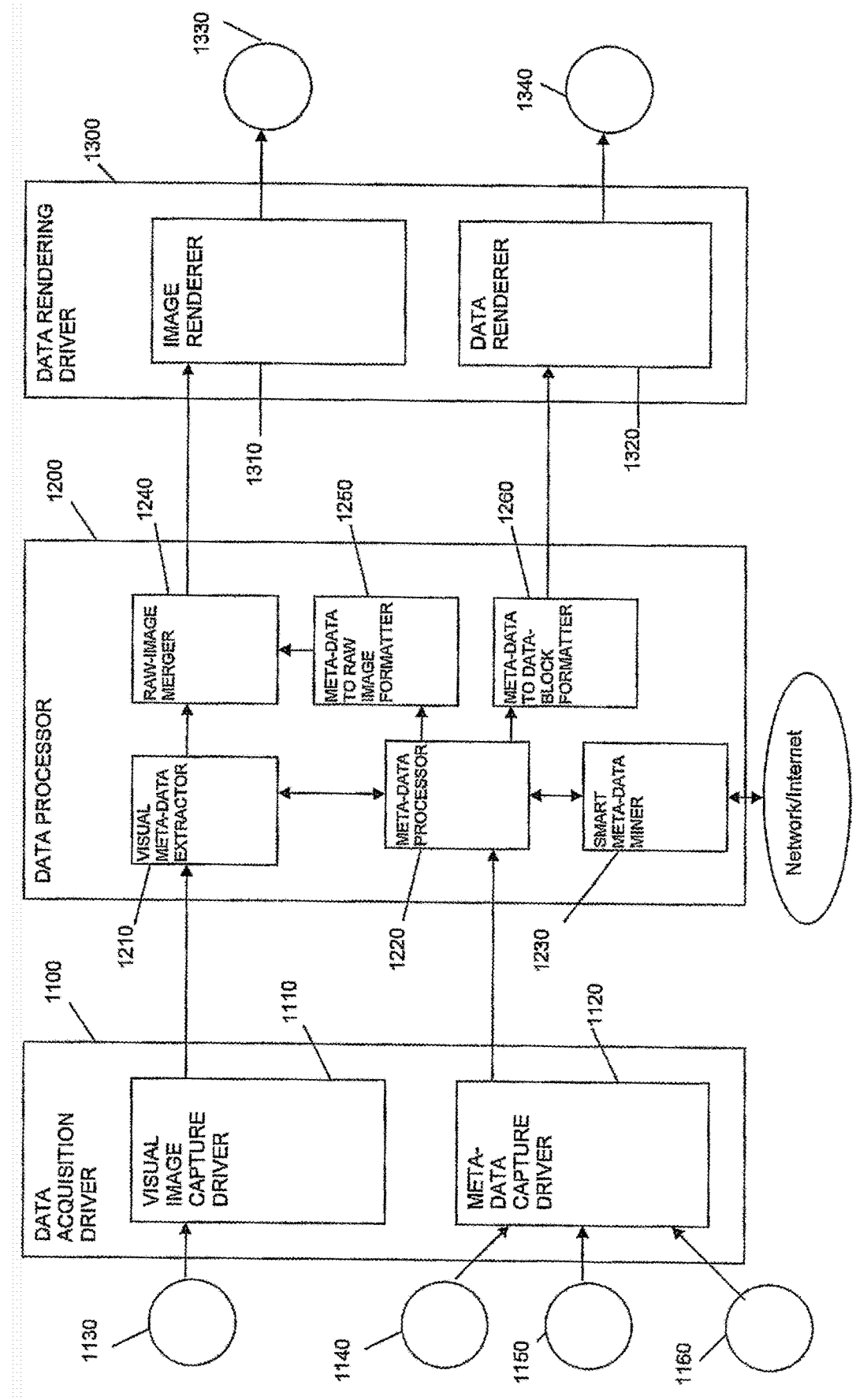
FIG. 3 illustrates a schematic of an apparatus to embed meta-data in an image according to an aspect of the present invention.

FIG. 3 illustrates a schematic of an apparatus to embed meta-data in an image according to an aspect of the present invention. As shown in FIG. 3, the apparatus 1000 includes a data acquisition driver 1100, a data processor 1200, and a data rendering driver 1300.

In aspects of the present invention, the data acquisition driver 1100 acquires, or receives input of, image data, and other data corresponding to the image data (referred to as an associated data), and outputs the image data and the associated data to the data processor 1200. In turn, the data processor 1200 processes the acquired or received image data and the associated data, generates meta-data based on the image data, the associated data, or both, converts the meta-data into a visual format (referred to as a sub-visual meta-data) or a data block format (referred to as a block meta-data), and either embeds the sub-visual meta-data into the image data or provides the block meta-data for later rendering. Additionally, the rendering driver 1300 receives the image data that is embedded with the sub-visual meta-data and/or the block meta-data from the data processor 1200, and outputs the image data that is embedded with the sub-visual meta-data as an output image, or renders the block meta-data as a visual standalone meta-data, or both.

Referring to FIG. 3 in greater detail, the data acquisition driver 1100 includes a visual image capture driver 1110 and a meta-data capture driver 1120. In aspects of the present invention, the visual image capture driver 1110 may be a device, software (SW), or firmware (FW) of the apparatus 1000, and may simply obtain an image from a visual capture device 1130, or may trigger the visual capture device 1130 to capture the image, and output the obtained or captured image to the visual image capture driver 1110. The visual image capture driver 1110 may also process the obtained or captured image, which may be in a predetermined data format, and convert the image into another predetermined data format or may preprocess the image for later processing in the data processor 1200. The visual image capture driver 1110 then outputs the image in the predetermined data format, or which has been preprocessed, to the data processor 1200.

In aspects of the present invention, the visual capture device 1130 may be any device capable of capturing or obtaining an image. For example, the visual capture device 1130 may be a built-in and/or externally connected video capture device, which is used to take a picture, a video, or a sequence of pictures of an item or a location, such as inventory or a warehouse. Other examples of the visual capture device 1130 include a digital camera, a scanner, a camcorder, a cellphone having a camera function, a portable data terminal (PDT), and a webcam, for example, and may also encompass built-in optical imager device, and an external video camera connected over BLUETOOTH. The image obtained by the visual capture device 1130 maybe in any image format, including JPEG (Joint Photographic Experts Group), PDF (Portable Document Format), TIFF (Tagged Image File Format), or MPEG (Moving Picture Experts Group), for example.

While the visual image capture driver 1110 obtains an image from the visual capture device 1130, the meta-data capture driver 1120 obtains a user input, environmental data, and/or collected data to associate with the obtained image, from a user input device 1140, one or more environment sensors, and/or a smart meta-data collection agent. Instead of simply obtaining the user input, the environmental data, and/or the collected data, the meta-data capture driver 1120 may trigger the user input device 1140 to obtain and output the user input, the one or more environment sensors 1150 to obtain and output the environmental data, and the smart meta-data collection agent 1160 to obtain and output the collected data. Each of the user input device 1140, the one or more environment sensors 1150, and the smart meta-data collection agent 1160 outputs the respective user input, the environmental data, and/or the collected data to the data processor 1200, and especially, the meta-data capture driver 1120.

In aspects of the present invention, the user input device 1140 may be any device capable of obtaining an input from a user. For example, the user input device 1140 may be a built-in and/or externally connected user-system interaction device, which is used to obtain preferences and various data input from the user. Examples of the user input device 1140 include a keyboard, a key pad, a mouse, a touch screen, a touch pad, a scanner, and a trackball, for example. Additionally, the user input device 1140 may include an optical imager device to scan a 2D barcode representation or optical character recognition (OCR)-recognizable text presented by the user on plain paper. In aspects of the present invention, the user input device 1140 may be wired or wireless devices. Wireless devices may be BLUETOOTH devices, for example.

In aspects of the present invention, the one or more environment sensors 1150 may be any device capable of obtaining data from the environment that is associated with the image. For example, the one or more environment sensors 1150 may be built-in and/or externally connected sensors, which are used to gather complimentary information from the environment in which the image was taken. Examples of the one or more environment sensors 1150 include thermometers or other meteorological sensors, a body-temperature and blood pressure meter, a GPS locator, an electronic compass, a movement sensor, a speech recognizer, a radio frequency identification (RFID) sensor, a facial biometry reader, a fingerprint reader, an electronic key reader, and a timepiece, for example.

In further illustrating the different types and use of the above environment sensors 1150, it should be understood that the following examples are non-limiting. For example, environment sensors 1150 may be thermometers or other meteorological sensors if the associated image is of a cloud; may be a body-temperature and blood pressure meter if the associated image is of a patient in a hospital, a GPS locator if the associated image is of a historic building, and so on. In aspects of the present invention, the one or more environment sensors 1150 may be wired or wireless devices. Wireless devices may be BLUETOOTH devices, for example.

In aspects of the present invention, the smart meta-data collection agent 1160 may be any device capable of obtaining data of, or for use with, the image. For example, the smart meta-data collection agent 1160 may be used to perform a database query, run internet searches, and/or mine databases for data relating to the image. Accordingly, the smart meta-data collection agent 1160 may be an on-device database query agent, a remotely running internet search agent connected over TCP/IC, or a remote database mining agent connected over Global System for Mobile communications/General Packet Radio Service (GSM/GPRS) connection, in aspects of the present invention, though not limited thereto.

In various aspects, the user input device 1140, the one or more environment sensors 1150, and the smart meta-data collection agent 1160 may be devices, such as hardware, or may be software (SW) or firmware (FW) that runs on a processor or a dedicated device. The user input, the environmental data, and/or the collected data respectively output from the user input device 1140, the one or more environment sensors 1150, and the smart meta-data collection agent 1160 are collected in the meta-data capture driver 1120. The meta-data capture driver 1120 processes the user input, the environmental data, and/or the collected data, and generates an associated data from the user input, the environmental data, the collected data, and/or portions thereof. The associated data may already be a meta-data in a predetermined format. The associated data is then output to the data processor 1200.

In aspects of the present invention, the associated data corresponds to the obtained or captured image from the visual capture device 1130, and provides additional information about the image. For example, the associated data may be jargon term for an item that is input by the user if the image is of the item that is part of an inventory, or may be descriptive information of a location that is input by the user if the image is of that location, such as, a warehouse. On the other hand, the associated data may be the environmental data, such as temperature and/or humidity, obtained by the one or more environment sensors 1150 if the image is of a warehouse containing certain inventory, such as, ice cream. Additionally, the associated data may be the collected data, such as recall information, obtained by the data collection agent 1160 if the image is of merchandise that has been found defective.

Referring back to FIG. 3, the data processor 1200 processes the various acquired or received data (including the image and the associated data) from the data acquisition driver 1100, namely, from the visual image capture driver 1110 and the meta-data capture driver 1120. The data processor 1200 uses the acquired or received data to generate meta-data that is associated with the image, and embeds the meta-data to the image or provides the meta-data for later rendering. The data processor 1200 includes a visual meta-data extractor 1210, a meta-data processor 1220, a smart meta-data miner 1230, a raw-image merger 1240, a meta-data to raw-image formatter 1250, and a meta-data to data-block formatter 1260, for example.

In aspects of the present invention, the visual meta-data extractor 1210 may be a device, software (SW), or firmware (FW), and receives input of the obtained or captured image (o referred to as simply an image) in a predetermined data format or which has been preprocessed, analyzes the image, and extracts one or more meta-data that characterizes the image. Further, the visual meta-data extractor 1210 obtains additional meta-data from, or provides the meta-data to, one or more other components of the data processor 1200, such as the meta-data processor 1220. Additionally, the visual meta-data extractor 1210 outputs, to the raw-image merger 1240, the image either as is (referred to as a raw image), or enhanced by highlighting one or more characteristics in the image that were extracted and turned into meta-data (referred to as an enhanced image) according to a user preference.

In aspects of the present invention, the visual meta-data extractor 1210 may be a logical component implemented in software (SW) and/or firmware (FW), such as a field programmable gate array (FPGA) or a complex programmable logic device (CPLD), and is used to analyze the image in the predetermined data format or which has been preprocessed, and extracts (or generates) meta-data from the image. For example, the extracted meta-data may include information as to face recognition, biometry data extraction, OCR recognition, object recognition, and position/distance measurement, for example, from the image. Once the meta-data is extracted, the image may be output in an enhanced format to indicate that meta-data has been extracted from the image. For example, a face in the image may be highlighted. In aspects of the present invention, the preference for which characteristics of the image to extract as meta-data may be based on user preference.

In aspects of the present invention, the meta-data processor 1220 may be a device, software (SW), or firmware (FW), and receives the associated data (which may be meta-data in a predetermined format) from the meta-data capture driver 1120, the image from the visual meta-data extractor 1210, and/or the extracted meta-data from the visual meta-data extractor 1210. The meta-data processor 1220 analyzes the received associated data, the extracted meta-data, and/or the image, extracts additional meta-data from the associated data and/or the image, consolidates or generates a consolidated meta-data from the extracted meta-data and the additional meta-data that characterizes the image and information related to the image data, respectively, and outputs the consolidated meta-data to the meta-data to RAW image formatter 1250 and/or the meta-data to data-block formatter 1260.

In addition to the meta-data processor 1220 obtaining the extracted meta-data, or the image as is or in an enhanced format, from visual meta-data extractor 1210, the meta-data processor 1220 may provide one or more meta-data that have been consolidated or generated to the visual meta-data extractor 1210. Additionally, the meta-data processor 1220 may obtain supplementary meta-data from the smart meta-data miner 1230 so that the meta-data processor 1220 may generate or consolidate the consolidated meta-data by also using the supplementary meta-data or portions thereof. Further, the meta-data processor 1220 may provide the consolidated meta-data to the smart meta-data miner 1230. The supplementary meta-data is additional data that is obtained from an outside source, and may be obtained based on the associated data, the extracted meta-data, and/or the image.

In aspects of the present invention, the consolidated meta-data need not be generated or consolidated from the entire associated data, the extracted meta-data, the image, and/or supplementary meta-data by the meta-data processor 1220. Rather, the consolidated meta-data may be consolidated or generated from one or more portions of the associated data, the extracted meta-data, the image, and/or the supplementary meta-data, respectively. Examples of one or more portions of the associated data, the extracted meta-data, the image, and/or the supplementary meta-data may include information that relate to the image, such as, time the image was taken, geographical position the image was taken, types of objects depicted in the image, properties of the subjects (or depicted items) of the image, temperatures of the subject or the environment at the time when the image was taken, and/or skin tone, if the image is of a person.

The output of the meta-data processor 1220 is consolidated meta-data that is generated or consolidated from all the associated data, the extracted meta-data, the image, the supplementary meta-data, or portions thereof that were obtained from the meta-data capture driver 1120, the visual meta-data extractor 1210, and the smart meta-data miner 1230. The consolidated meta-data may be generated or consolidated also by combining or synthesizing the associated data, the extracted meta-data, the image, and/or the supplementary meta-data. Then, the consolidated meta-data is output from the meta-data processor 1220 to the meta-data to RAW image formatter 1250 and/or the meta-data to data-block formatter 1260.

In aspects of the present invention, the smart meta-data miner 1230 may be logical components implemented in software (SW), a device, or firmware (FW), and connects to remote information sources, such as data bases, search engines, and/or search agents that are accessible via a network and/or the internet. The smart meta-data miner 1230 searches and retrieves the supplementary meta-data that is additional to a base meta-data provided or queried by the meta-data processor 1220. As discussed above, the smart meta-data miner 1230 provides the retrieved supplementary meta-data to the meta-data processor 1220.

In aspects of the present invention, the meta-data to RAW image formatter 1250 is an image processing component implemented in software (SW) and/or firmware (FW), and projects or converts the consolidated meta-data onto a visual representation according to user preference, such as a 2D barcode. Hereinafter, the visual representation of the consolidated meta-data is referred to as a meta-data sub-Image. The meta-data to RAW image formatter 1250 outputs the meta-data sub-image to the RAW-image merger 1240.

In aspects of the present invention, the RAW-image merger 1240 is an image processing component implemented in software (SW) and/or firmware (FW), and merges the raw image or the enhanced image from the visual meta-data extractor 1210 with the meta-data sub-image from the meta-data to RAW-image formatter 1250, into one overall merged image according to user preferences. In other aspects, the RAW-image merger 1240 embeds the meta-data sub-image into the raw image or the enhanced image to generate an embedded image. In aspects of the present invention, the merged image and embedded image may be referred to as simply a combined image. Accordingly, the combined image is output from the data processor 1200 to the data rendering driver 1300. Particularly, the combined image from the RAW-image merger 1240 is output to the image render 1310 in the data rendering driver 1300. In aspects of the present invention, the meta-data to data-block formatter 1260 is a data processing component implemented in software (SW) and/or firmware (FW), and formats the consolidated meta-data into a standalone user or machine recognizable representation of the consolidated meta-data according to user preferences. Once formatted, the meta-data to data-block formatter 1260 outputs the formatted consolidated meta-data representation to the data rendering driver 1300. Particularly, the formatted consolidated meta-data representation is output from the meta-data to data-block formatter 1260 to the data render 1320 of the data rendering driver 1300. Hereinafter, the formatted consolidated meta-data representation will be referred to as a standalone meta-data representation.

It should be understood that in some aspects of the present invention, the RAW-image merger 1240 receives the raw image or the enhanced image from the visual meta-data extractor 1210, and simply outputs the raw or the enhanced image to the image render 1310, without creating a combined image, according to user preference. If the raw or the enhanced image is simply output, the standalone meta-data representation from the data renderer 1320 may be output to be physically attached or adhered to the raw or the enhanced image that is rendered by the image renderer 1310.

Referring back to FIG. 3, the data rendering driver 1300 receives the combined image and/or the standalone meta-data representation from the data processor 1200, and outputs a primary output 1330 that is a visually rendered combined image and/or a secondary output 1340 that is a rendered standalone meta-data representation. The data rendering driver 1300 includes the image renderer 1310 and the data renderer 1320. The image renderer 1310 receives the combined image and outputs the rendered combined image, and the data renderer 1320 receives the standalone meta-data representation and outputs the rendered standalone meta-data representation. Once output, one or both of the primary output 1330 and the secondary output 1340 may be saved or stored in an electronic form or other format in the apparatus 1000, and/or transferred to an outside device for later processing, rendering, or publishing. The storing, processing, rendering, and publishing of the primary output 1330 and the secondary output 1340 may include use of any storage medium or distribution network such that information systems or media broadcasting services are able to search for, process, and render primary output 1330 in the form of the combined image and/or the secondary output 1340 in the form of the standalone meta-data representation.

In aspects of the present invention, the image renderer 1310 is a component implemented in software (SW) and/or firmware (FW), and outputs a primary output 1330 that results from merging or embedding the meta-data sub-image into the raw image or the enhanced image, and then rendering the combined image. In aspects of the present invention, the primary output 1330 is a visually readable image or a picture, and having the meta-data sub-image that overlies a selected portion of the image or the picture according to user preference. In aspects of the present invention, the location of the meta-data sub-image in the image, when rendered, may be in a predetermined portion of the image. Examples of such locations include a particular corner of a rectangular image, or a border of the rectangular image that may be added or augmented to an existing or standard border. Additionally, the meta-data sub-image, when rendered with the image, may be a watermark that is semi-visible, semi-transparent, or translucent.

Additionally, in an aspect of the present invention, the meta-data sub-image may be rendered as a symbol, text, script, or barcode, where examples of such barcodes include linear barcodes, such as, universal product codes (UPC), or matrix or 2D barcodes, such as, an Aztec code. In aspects of the present invention, the usable type of barcode or other symbols to render the meta-data sub-image is not limited. Additionally, in aspects of the present invention, the meta-data sub-image may be rendered to be located in the upper-right corner of the image.

In aspects of the present invention, the combined image may be rendered or output by being printed on a medium. In aspects of the present, the medium may be paper, a plastic card, a label, for example. Accordingly, the combined image may be implemented as a photograph, a PDF file, an x-ray image, or an image that is displayed on display screen, for example. If the output is printed on a medium, a printer may be further utilized to print the combined image to the medium.

In aspects of the present invention, the data renderer 1320 is a component implemented in software (SW) and/or firmware (FW), and outputs a complementary output 1340 that is the standalone meta-data representation. The standalone meta-data representation is rendered in a selected structured format, which can be used to physically attach the rendered standalone the meta-data representation to a rendered raw image or the enhanced image. Additionally, the standalone meta-data representation may be used to electronically attach the standalone meta-data representation to the raw image or the enhanced image in their electronic formats. Additionally, the standalone meta-data representation may simply be stored electronically.

To elaborate, the physical attachment of the rendered standalone meta-data representation to the rendered raw image or the enhanced image may be exemplified by physically attaching a printed barcode to a separately printed image. However, the separate printing of the image related to the standalone meta-data representation is not required. For example, in aspects of the present invention, the standalone meta-data representation may be in a format, namely, a visual picture file, such as bitmap, that contains a 2D barcode to be printed as a label. The label can then be physically attached unto an item that was the subject of the image used to generate the 2D barcode. The item that is the subject of the image may be a mail parcel, and the label may be an address label for the mail parcel. Other items that may be the subject of the image may include a rental car, warehouse inventory items, or air passenger luggage.

On the other hand, the electronic attachment of the standalone meta-data representation to the raw image or the enhanced image may be exemplified by associating date/time information, shutter speed information, and/or light conditions information to a regular digital camera JPEG file. Finally, the electronically storing of the standalone meta-data representation may be exemplified by storage of the standalone meta-data representation in a computer database. If stored in such a manner, the standalone meta-data representation and information thereof can be published to be searchable by smart data search engines, information systems, and/or media broadcasting services.

As discussed above, the image renderer 1310 outputs a primary output 1330 that results from merging or embedding the meta-data sub-image into the raw image or the enhanced image, and which is the combined image, and the data renderer 1320 outputs a complementary output 1340 that is the standalone meta-data representation. In aspects of the present invention, one or both of the primary output 1330 in the form of the combined image and the secondary output 1340 in the form of the standalone metadata representation may be saved or stored in an electronic form or other format in the apparatus 1000, and/or transferred to an outside device or the renderer for later processing, rendering, or publishing. In aspects of the present invention, the transfer to the outside device or renderer to be processed, rendered, or published may be by way of a network or the internet, and the outside device or renderer may be a remote network server or a mobile device. Once stored or published through use of any storage medium or distribution network, the combined image and/or the standalone meta-data representation may be searchable or searched by information systems or media broadcasting services.

Additionally, the one or both of the primary output 1330 in the form of the combined image and the secondary output 1340 in the form of the standalone metadata representation may be output in the electronic form or the other format to a virtual medium, or may be broadcast. In aspects of the present invention, the virtual medium may be a networked server hard-drive, or a remote mobile device file-system. The primary and/or the secondary output to be broadcast may be forwarded to a public-internet or company-intranet web-page, or output as a broadcast video stream to be broadcast for viewing via a display or a television, or output as a web page RSS-feed to be distributed over a community of mobile devices, or any combinations thereof. Additional types of publishing or broadcasting formats may include JPEG and MPEG formats for displays, such as on LCD-TV screens, or BITMAP format for mobile devices, such as personal digital assistants (PDAs) or cell phones.

The above aspects of FIG. 3 discusses the apparatus 1000 in terms of images, so that the apparatus 1000 acquires image data and other data corresponding to the image data; generates a meta-data based on the image data and the corresponding other data; merges or embeds the meta-data into the image and/or providing a standalone meta-data; and renders a combined image and/or the standalone meta-data. However, it should be understood that the apparatus need not be limited to handling images, and the inputs for the apparatus 1000 can be non-visual inputs, such as, sound or machine readable data. In general, the inputs for the apparatus 1000 may simply be any data that can be merged or embedded with a corresponding meta-data.

Accordingly, if the input for the apparatus 1000 is music, the data acquisition driver 1100 acquires, or receives input of, music data and other data corresponding to the music data (referred to as the associated data), and outputs the music data and the associated data to the data processor 1200. In turn, the data processor 1200 processes the acquired or received music data and the associated data, generates meta-data based on the music data, the associated data, or both, converts the meta-data into an audible format (referred to as a sub-aural meta-data) or a data block format (referred to as a block meta-data), and either embeds the sub-aural meta-data into the music data or provides the block meta-data for later standalone rendering. Additionally, the rendering driver 1300 receives the music data embedded with the sub-aural meta-data, and the block meta-data from the data processor 1200; and outputs the music data embedded with the sub-aural meta-data as output sound, or renders the block meta-data as an aural standalone meta-data, or both. The embedded sub-aural meta-data may be reproduced before or after the music data, in aspects of the present invention.

FIG. 4 illustrates a method of embedding meta-data to an obtained data according to an aspect of the present invention. In aspects of the present invention, the method of FIG. 4 may be practiced using the apparatus 200 as shown in FIG. 2.

Referring to FIG. 4, first data, and second data that is associated with or corresponds to the first data, are acquired or received in operation S410. The acquired or received first data and the associated second data is processed to generate meta-data based on the first data, the associated second data, or both, in operation S420. The, the meta-data is converted into a format of the first data (referred to as a sub meta-data) or another format (referred to as a block meta-data), and the meta-data is embedded into the first data as a combined data. Accordingly, the first data and the meta-data are integrated into a combined data in operation S430. In other aspects of the present invention, the meta-data may also be provided additionally as a standalone meta-data for later rendering.

Once the first data and the meta-data are integrated into the combined data, the combined data is output in a predetermined format, and/or standalone meta-data is rendered in the same or different format as the predetermined format in operation S440. In aspects of the present invention, the first and second data may be an image, video, audio, sound, text, music, or in other human user or device perceivable formats.

FIG. 5 illustrates a method of embedding meta-data in an image according to an aspect of the present invention. The method of FIG. 5 may be practiced using the apparatus 1000 as shown in FIG. 3. Referring to FIG. 5, an image is obtained, for example, by being input or captured in operation S510. The obtained image may be a raw image in a predetermined data format, or may have been preprocessed for ease of later processing. Contemporaneously, or after the image is obtained, additional data is obtained that is of the obtained image, referred to as associated data, in operation S520. The associated data includes a user input data, environmental data, and/or collected data that is associated with the obtained image.

In aspects of the present invention, the user input data include preferences and various data input by the user. Examples of the user input may be an image, video, audio, sound, and/or text, and may be obtained from, a key pad, a mouse, a touch screen, a touch pad, a scanner, microphone, a digital camera, a video recorder, and/or a trackball, for example. Other examples of the user input may include a 2D barcode representation or optical character recognition (OCR)-recognizable text.

In aspects of the present invention, the environmental data includes data from the environment that is associated with the image. Examples of the environmental data may be temperature, humidity, pressure, GPS location, or time, and may be obtained from thermometers, pressure meter, a GPS locator, or a timepiece, for example.

In aspects of the present invention, collected data include any data for use with the image that is obtained from an outside source. Examples of the collected data may be recall data, for example, and may be obtained from a database query, internet searches, and/or mined databases for data relating to the image.

Referring back to FIG. 5, the image in the predetermined data format, or which has been preprocessed, is analyzed, and meta-data is extracted (or generated) from the image in operation S530. In aspects of the present invention, the extracted meta-data may include information as to face recognition, biometry data extraction, OCR recognition, object recognition, and position/distance measurement, for example, from the image. When the meta-data is extracted from the image, the image may be enhanced to indicate that meta-data has been extracted from the image. For example, a face in the image may be highlighted.

The above noted associated data, the extracted meta-data from the image, and/or the image itself, are consolidated to generate a consolidated meta-data in operation S540. Optionally, supplementary meta-data may further be obtained in operation S540 and may be included to generate the consolidated meta-data. The supplementary meta-data is obtained from an outside source, and may be obtained based on the associated data, the extracted meta-data, and/or the image. In aspects of the present invention, the consolidated meta-data need not be generated from the entire associated data, the extracted meta-data, the image, and/or supplementary meta-data. Rather, the consolidated meta-data may be generated from one or more portions of the associated data, the extracted meta-data, the image, and/or the supplementary meta-data.

Referring back to FIG. 5, a visual representation of the consolidated meta-data is generated by converting the consolidated meta-data into the same format as the image, for example, according to user preference in operation S550. The visual representation of the consolidated meta-data is referred to as a meta-data sub-image, and may be a 2D barcode. Optionally, the consolidated meta-data may be converted into a standalone meta-data representation to be later output in a desired format. Once the consolidated meta-data is generated, the raw image or the enhanced image is merged or embedded with the meta-data sub-image into a combined image according to user preferences in operation S560. Finally, the combined image may be output, or optionally, the image and a corresponding standalone meta-data representation may be output in operation S570. The output combined image and/or the image and a corresponding standalone meta-data representation may be published through use of any storage medium or distribution network to be searchable or searched by information systems or media broadcasting services. Additionally, the output combined image and/or the image and a corresponding standalone meta-data representation may be further output as a broadcast audio and/or video stream to be broadcast for viewing via a display or a television, or output as a web page RSS-feed to be distributed over a community of mobile devices.

Figure 6A:
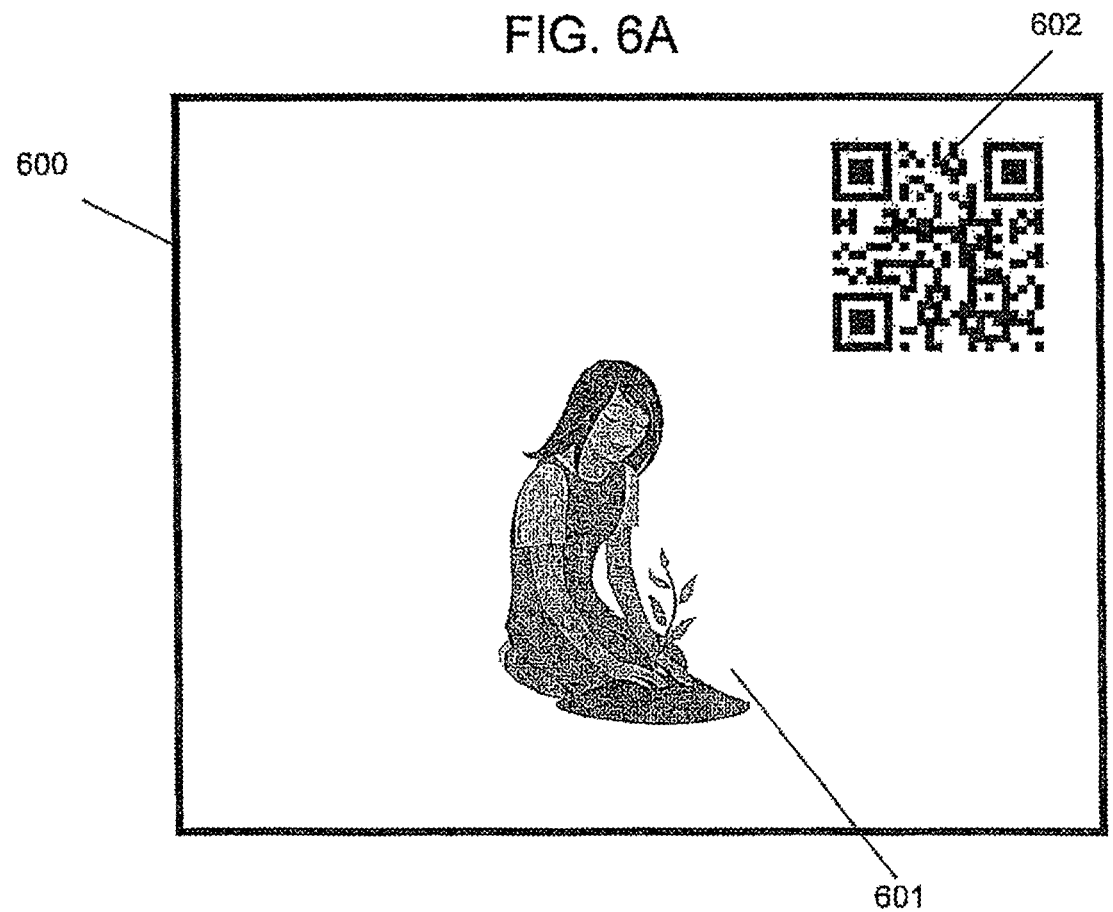
FIG. 6A illustrates an image with an embedded meta-data, referred to as a combined image, and 6B illustrates a standalone meta-data representation, which may be affixed to a separately rendered image, according to aspects of the present invention.

FIG. 6A illustrates an image with an embedded meta-data, referred to as a combined image, and 6B illustrates a standalone meta-data representation, which may be affixed to a separately rendered image, according to aspects of the present invention. As shown in FIG. 6A, the combined image 600 according to an aspect of the present invention is composed of a photographic image of a person 601, and an embedded meta-data sub-image 602 that is positioned in the upper right corner of the combined image 600. The person's image 601 is based on the obtained image from a digital camera (used as the visual capture device 1130 as shown in FIG. 3). The meta-data sub-image 602 is one that is generated from a consolidated meta-data using at least portions of the associated data, the extracted meta-data, the image, and/or supplementary meta-data, as discussed above with reference to FIGS. 3 and 5. The embedded meta-data sub-image 602 is shown as a 2D barcode, i.e., as an Aztec code.

As shown in FIG. 6A, the combined image is visually readily perceivable by a human user, programmatically perceivable by a device, or both. For example, when implemented to a passport photograph, the combined image 600 includes passport holder's image 601 as the subject image, and the embedded meta-data sub-image 602 that is associated with the passport holder. The entire combined image 600 is one that a human user can recognize immediately as a photograph having the Aztec code. Further, the human user can obtain information contained in the Aztec code by using an appropriate reader. Additionally, the entire combined image 600 is one the appropriate reader can be used to programmatically perceive both the photograph and the Aztec code.

In the aspect shown in FIG. 6A, the embedded meta-data sub-mage 602 is an image representation of the consolidated meta-data, which in turn is generated based on the associated data (including a user input data, the environmental data, and/or the collected data that is associated with the image), the extracted meta-data (based on the image), the image, and/or supplementary meta-data. That is, in the case of FIG. 6A, the consolidated meta-data may include personal identifying information about the passport holder shown in the image 601, such as, name and birthday, as user input data; GPS coordinates of where the image was taken as environmental data; and/or number of previous passports issued as collected data. Further, the consolidated meta-data may include visually identifying information, such as hair color or eye color, as extracted meta data based on the image; and confidential State Department code to insure authenticity of the image as the supplemental meta-data. Accordingly, an image and a corresponding meta-data are rendered together, whereby the corresponding meta-data (the consolidated meta-data) is embedded in the image.

Figure 6B:
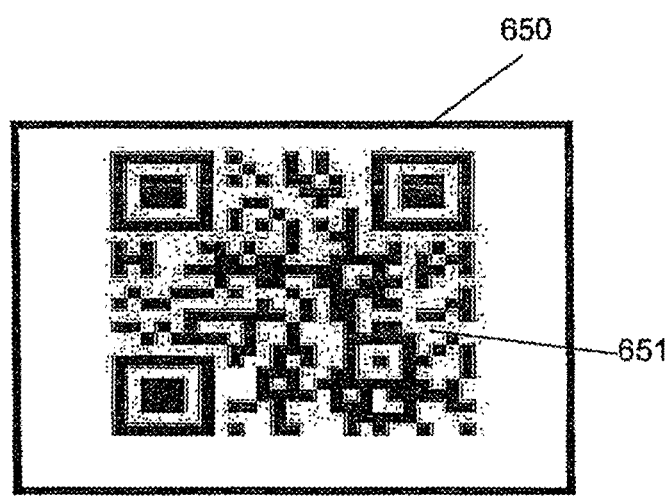

As shown in FIG. 6B, the standalone meta-data representation 650, which may be affixed to a separately rendered image is shown. The standalone meta-data representation 650, when rendered, may be a 2D barcode, such as, an Aztec code, as shown. In aspects of the present invention, the standalone meta-data representation 650 may be embodied as a self-adhering strip, such as a sticker, which may be affixed to a corresponding image, which may appear similar to FIG. 6A. In other aspects, the standalone meta-data representation 650, as a sticker, may be affixed to an item, such as a package, in order to provide information about the package, such as to identify the content and the destination.

As discussed above, aspects of the present invention relate to a method of embedding a meta-data that corresponds to an image into the image, and an apparatus to embed the corresponding meta-data into the image. Accordingly, additional information for an image is effectively collected when the image is captured, the additional information is to be transformed into a usable format as the corresponding meta-data, and embedded into a file of the captured image. The imbedded corresponding meta-data and the captured image may be rendered and perceived by a human user, a device, or both. Further, aspects of the present invention is not limited to an image, and are applicable to video, audio, sound, text, music, or in other human user or device perceivable formats.

In various aspects of the present invention, meta-data is information about the subject data, such as image, video, audio, sound, text, music, or data in other human user or device perceivable formats. Meta-data may document data about elements or attributes (name, size, data type, etc); about records or data structures (length, fields, columns, etc.); and about the data (where it is located, how it is associated, ownership, etc.), of a subject data. Also, meta-data may include descriptive information about the context, quality and condition, or characteristics of the subject data. Accordingly, meta-data is useable to facilitate the understanding, characteristics, and management usage of the subject data.

In aspects of the present invention, the meta-data sub-image is a code, and is neither text nor script.

In various aspects, and/or refers to alternatives chosen from available elements so as to include one or more of the elements. For example, if the elements available include elements X, Y, and/or Z, the and/or refers to X, Y, Z, or any combination thereof.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A method of embedding meta-data in an image, the method comprising:
    acquiring image data using a processor, the image data comprising a visual representation of a person captured by a scan engine;
    extracting or generating first meta-data from the image data using the processor, the first meta-data comprising facial recognition data and/or biometry data;
    acquiring associated data using the processor, the associated data acquired contemporaneously while acquiring the image data, the associated data comprising personal identifying information associated with the person and/or GPS coordinates of where the visual representation of the person was captured by the scan engine;
    extracting or generating second meta-data from the associated data using the processor;
    combining or synthesizing the first meta-data with the second meta-data using the processor to provide consolidated meta-data;
    generating a meta-data sub-image comprising a barcode encoding the first meta-data and the second meta-data, wherein the meta-data sub-image is a visual representation of the consolidated meta-data, and wherein the visual representation of the consolidated meta-data is generated by converting the consolidated meta-data in a same format as the image; and
    embedding the meta-data sub-image into the image to generate a combined image.

2. The method of claim 1, further comprising:
    printing the meta-data sub-image as a sticker; and
    attaching the sticker to a passport, wherein the sticker comprises of the barcode, and the barcode is scanned and decoded using a scan engine to obtain information related to the person encoded in the barcode.

3. The method of claim 2, further comprising retrieving the first meta-data and the second meta-data by scanning and decoding the barcode.

4. The method of claim 1, wherein the consolidated meta-data comprises a code which insures authenticity of the consolidated meta-data.

5. The method of claim 1, further comprising generating the combined image using a raw-image merger, the combined image comprising the meta-data sub-image merged with the visual representation of the person.

6. The method of claim 5, further comprising:
    printing the combined image as a sticker; and
    attaching the sticker to a passport, wherein the sticker comprises of the barcode, and the barcode is scanned and decoded using a scan engine to obtain information related to the identity of the person.

7. The method of claim 6, further comprising retrieving the first meta-data and the second meta-data by scanning and decoding the barcode at least in part using a scan engine.

8. The method of claim 5, further comprising:
    printing the combined image; and
    affixing the printed combined image to an article of luggage, wherein the printed combined image comprises of a visual representation of the person along with the barcode.

9. The method of claim 8, wherein the consolidated meta-data comprises a code which insures authenticity of the consolidated meta-data.

10. A method of embedding meta-data in an image, the method comprising:
    acquiring image data using a processor, the image data comprising a visual representation of a person captured by a scan engine;
    extracting or generating first meta-data from the image data using the processor, the first meta-data comprising facial recognition data and/or biometry data;
    acquiring associated data using the processor, the associated data acquired contemporaneously while acquiring the image data, the associated data comprising personal identifying information associated with the person and GPS coordinates of where the visual representation of the person was captured by the scan engine, the personal identifying information comprising a fingerprint of the person captured by a fingerprint reader;
    extracting or generating second meta-data from the associated data using the processor;

combining or synthesizing the first meta-data with the second meta-data using the processor to provide consolidated meta-data;

generating a meta-data sub-image comprising a barcode encoding the first meta-data and the second meta-data, wherein the meta-data sub-image is a visual representation of the consolidated meta-data, and wherein the visual representation of the consolidated meta-data is generated by converting the consolidated meta-data in a same format as the image; and embedding the meta-data sub-image into the image to generate a combined image;

printing the meta-data sub-image; and affixing the printed meta-data sub-image to a mail parcel or an article of luggage, wherein the printed meta-data sub-image comprises of the barcode, and the barcode is scanned and decoded using a scan engine to obtain information related to the identity of the person.

* * * * *